US010119266B1

(12) United States Patent
Jeon et al.

(10) Patent No.: US 10,119,266 B1
(45) Date of Patent: Nov. 6, 2018

(54) EXTENSIBLE SPARSE-ISOGRID COLUMN

(71) Applicants: Sungeun K. Jeon, Albuquerque, NM (US); Jeremy Banik, Albuquerque, NM (US); Michael Peterson, Albuquerque, NM (US)

(72) Inventors: Sungeun K. Jeon, Albuquerque, NM (US); Jeremy Banik, Albuquerque, NM (US); Michael Peterson, Albuquerque, NM (US)

(73) Assignee: The Government of the United States of America as Represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/388,647

(22) Filed: Dec. 22, 2016

(51) Int. Cl.
| | |
|---|---|
| *E04H 12/18* | (2006.01) |
| *E04B 1/343* | (2006.01) |
| *B64G 1/10* | (2006.01) |
| *E04B 1/344* | (2006.01) |
| *E04B 1/19* | (2006.01) |
| *B64G 1/22* | (2006.01) |

(52) U.S. Cl.
CPC ............ *E04B 1/34357* (2013.01); *B64G 1/10* (2013.01); *B64G 1/222* (2013.01); *E04B 1/19* (2013.01); *E04B 1/344* (2013.01)

(58) Field of Classification Search
CPC .. B64G 1/10; B64G 1/222; E04B 1/19; E04B 1/344; E04B 1/34357
USPC ........................................................... 52/646
See application file for complete search history.

(56) References Cited

U.S. PATENT DOCUMENTS

| | | | | |
|---|---|---|---|---|
| 3,751,863 A | * | 8/1973 | Lyons | E04H 12/185 52/111 |
| 4,151,872 A | | 5/1979 | Slysh et al. | |
| 4,599,832 A | * | 7/1986 | Benton | E04H 12/185 5/99.1 |
| 4,604,844 A | * | 8/1986 | Mikulas, Jr. | E04H 12/182 52/111 |
| 5,163,262 A | * | 11/1992 | Adams | B64G 9/00 52/111 |
| 5,977,932 A | | 11/1999 | Robinson | |
| 6,345,482 B1 | * | 2/2002 | Warren | B64G 1/222 52/646 |
| 6,560,942 B2 | * | 5/2003 | Warren | B64G 1/222 52/646 |
| 6,970,143 B2 | | 11/2005 | Allen et al. | |

(Continued)

*Primary Examiner* — Charles A Fox
*Assistant Examiner* — James J Buckle, Jr.
(74) *Attorney, Agent, or Firm* — James M. Skorich

(57) ABSTRACT

A sparse-isogrid columnar lattice structure including rigid ring frames connected by a mirrored symmetric double helix pattern comprised of first shell hinge elements in a first helical pattern and second shell hinge elements in a second helical pattern oriented in an opposite direction to the first helical pattern and congruent thereto. The helical axes of the first and second helical patterns intersect the respective centers of the ring frames. The first and second shell hinge elements are configured to stow in a stored energy state when the ring frames are collapsed toward one another along the helical axis, and the first and second shell hinge elements are configured to release the stored energy to deploy to a restored state and extend the ring frames apart from each other along the helical axis when deployed to form a stable rigid axial column in a restored state.

21 Claims, 7 Drawing Sheets

(56) References Cited

U.S. PATENT DOCUMENTS

| | | | |
|---|---|---|---|
| 7,132,027 B2 * | 11/2006 | Jensen | B29C 53/564 |
| | | | 156/175 |
| 7,703,615 B2 * | 4/2010 | Willim | B66C 23/70 |
| | | | 212/175 |
| 8,444,900 B2 * | 5/2013 | Wilson | B29C 33/42 |
| | | | 156/173 |
| 8,770,522 B1 | 7/2014 | Murphey et al. | |
| 9,668,600 B1 * | 6/2017 | Lau | A47J 47/14 |
| 9,714,519 B2 * | 7/2017 | Slade | B64G 1/222 |

\* cited by examiner

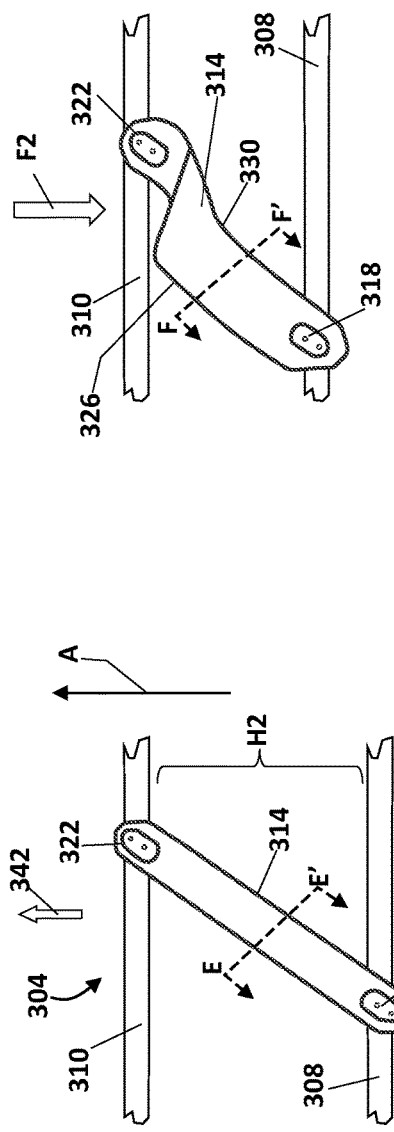
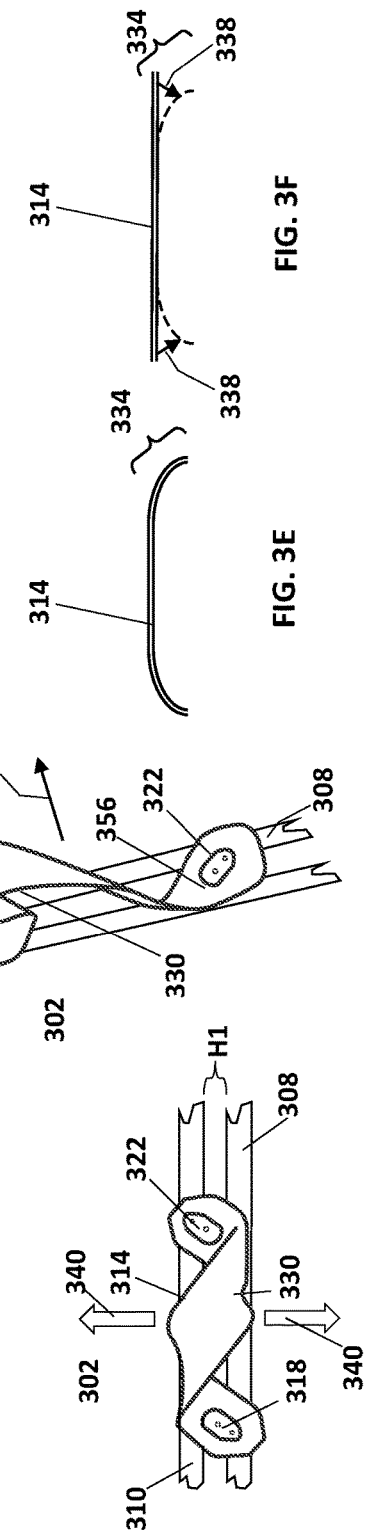

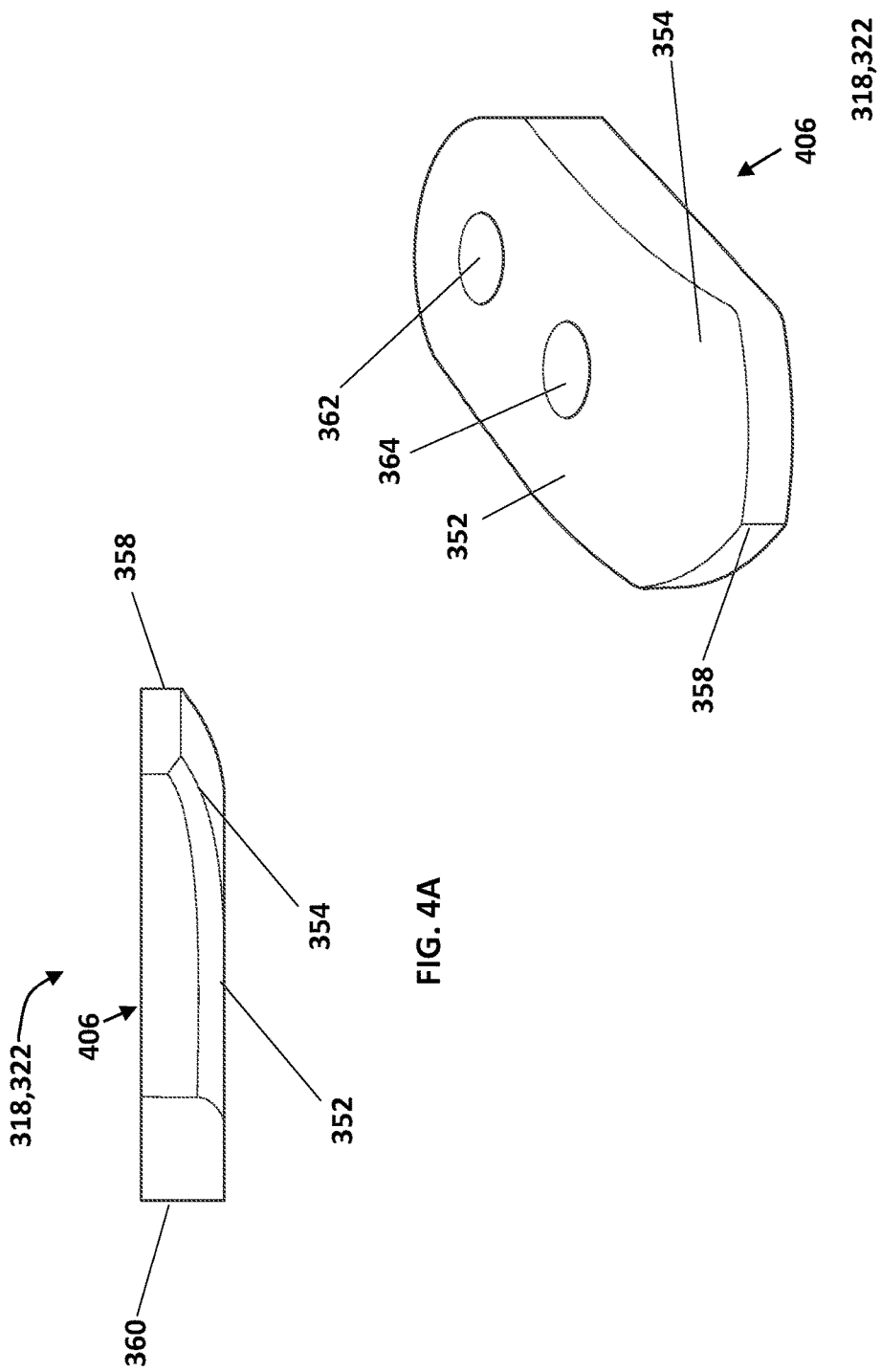

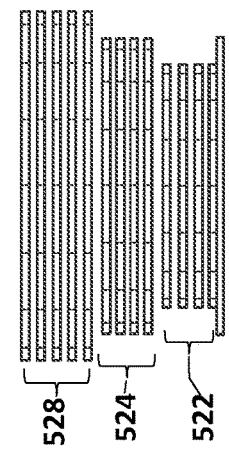
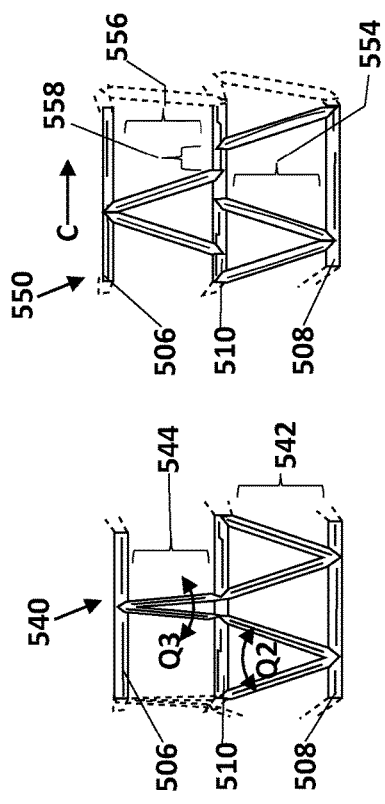
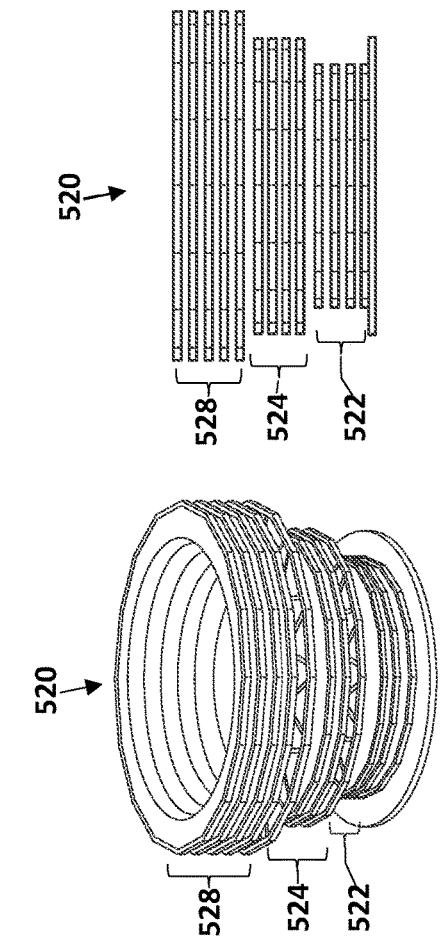
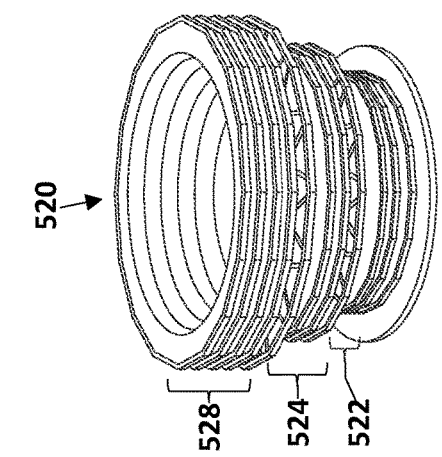
FIG. 5F
FIG. 5D
FIG. 5E
FIG. 5C

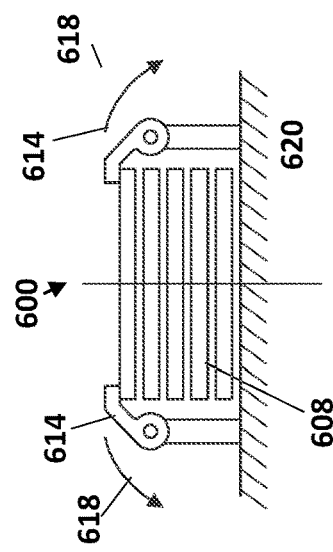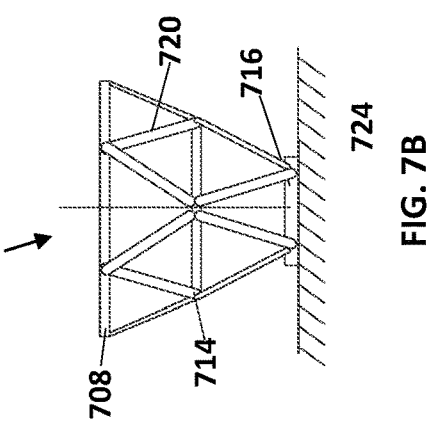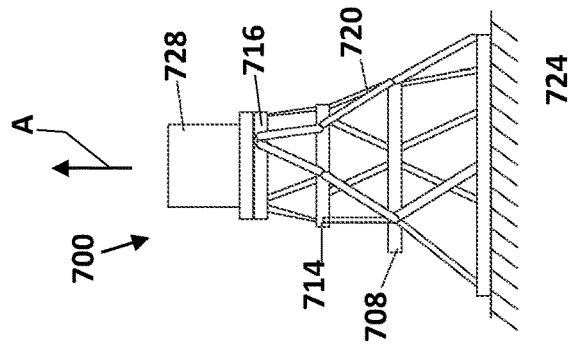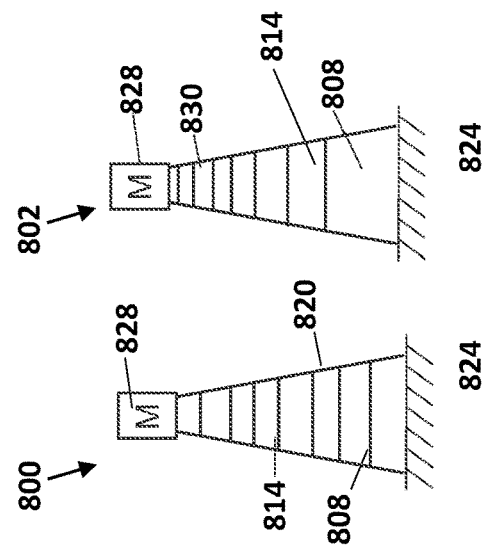

EXTENSIBLE SPARSE-ISOGRID COLUMN

GOVERNMENT INTEREST

The invention described herein may be manufactured and used by or for the Government of the United States for all government purposes without the payment of any royalty.

TECHNICAL FIELD

The embodiments herein generally relate to an extensible sparse-isogrid column structure, and more particularly to a sparse-isogrid column structure with high strain composite ribs, which can be configured to freely deploy.

BACKGROUND

Conventional isogrid structures can be efficient structures, and a thin-walled isogrid column can be considered a mass-efficient column design for space structures. However, attempts at developing a feasible deployable isogrid boom have not overcome issues such as local wall buckling due to sensitivity to fabrication error or robust deployment schemes.

The isogrid has been found to be a structurally efficient structure, mathematically. Small members arranged in a triangular grid provide the structural efficiency. The grid provides strength, but allows small rods to be used in the triangles. Small rods can be used because the isogrid mainly applies axial force along each member, allowing for use of small and low mass rods in the structure. Each rod merely needs to be strong enough to not buckle. While isogrids have been used in aerospace applicable structures, isogrids have been limited to monolithic panels or tubes that do not deploy. Deployable versions of isogrid structures have been researched, but have met with moderate success. Isogrid structures can be difficult to construct in a way that they are not structurally compromised or economically infeasible for some reason. In other words, isogrid structures have been viewed in the past as difficult to construct to be competitive with other deployable designs. Some problems to overcome were manufacturing inefficiencies, cost to build due to complexities, the compaction for stowage can be not very good, or isogrid structures may have to add mass to components to keep the isogrid structures from breaking.

The above information disclosed in this Background section is only for enhancement of understanding of the background of the disclosure and therefore it may contain information that does not form any part of the prior art nor what the prior art may suggest to a person of ordinary skill in the art.

SUMMARY

In view of the foregoing, an embodiment herein provides a tubular structure configured to articulate between a stowed and a deployed configuration, the tubular structure includes a double helix and a plurality of rigid rings. The double helix includes a helix axis, a first helix, and a second helix congruent to the first helix, oriented in an opposite direction to the first helix. The plurality of rigid rings are connected to the first helix and the second helix, each rigid ring disposed on a respective parallel plane transverse to the helix axis, and each rigid ring comprising a respective ring center intersected by the helix axis. The first helix and the second helix are configured to flex to translate the plurality of rigid rings with respect to each other along the helix axis. The rotation of the rigid rings about the helix axis relative to the first and second helixes is restricted by the connected first and second helixes. In a stowed configuration, a restraining force compresses the first and second helixes, and the tubular structure is disposed in a deployed configuration in the absence of the restraining force.

In some aspects, the first and second helixes may be extended to respective maximum lengths in the deployed configuration. The plurality of rigid rings may be spaced apart by a maximum distance in the deployed configuration. The plurality of rigid rings may be separated by a minimum distance in the stowed configuration, with the minimum distance being less than the maximum distance. In some aspects, the restraining force may be substantially collinear with the helical axis, the first and second helixes may be respectively comprised of flexible tape springs for storing a restorative force opposed to the restraining force, and the restorative force may articulate the tubular structure to the deployed configuration upon removal of the restraining force. In some aspects, the tubular structure may further comprise a restraint for applying the restraining force to the first and second helixes to oppose the restorative force.

Another embodiment herein provides a deployable column lattice structure including a plurality of ring frames and a double helix pattern. The plurality of ring frames are disposed substantially transverse to an axial direction, and comprise respective ring centers disposed substantially collinearly. The double helix pattern is disposed substantially coaxially to the plurality of ring frames along the axial direction, the double helix pattern is comprised of a first portion of shell hinge elements connected to the plurality of ring frames and extends substantially in a first helical pattern, and a second portion of shell hinge elements is connected to the plurality of ring frames and extends substantially in a second helical pattern congruent to the first helical pattern and oriented in an opposite direction to the first helical pattern. The first and second portions of shell hinge elements are configured to articulate between a flexed position in a stowed configuration and an unflexed position in a deployed configuration.

In some aspects, the first and second portions of shell hinge elements may include a first stored elastic force in the flexed position to dispose the plurality of ring frames a first distance along the axial direction from each other, and the first and second portions of shell hinge elements may include a second stored elastic force less than the first stored elastic force in the unflexed position to dispose the plurality of ring frames a second distance along the axial direction from each other greater than the first distance. In some aspects, at least one of the first and second portions of shell hinge elements may curl transverse to a respective first and second helical spiral direction upon removal of the restraining force, to propel the plurality of ring frames to the unflexed position along the axis. In some aspects, the deployable column lattice structure may further include a retarding device configured to apply a retarding force to slow translation of the plurality of ring frames from the flexed position to the unflexed position.

In some aspects, the deployable column lattice structure may further include a reset device configured to apply a reset force to articulate the first and second portions of shell hinge elements from the unflexed position to the flexed position. In the unflexed position, at least one of the first and second portions of shell hinge elements may include a curved cross-section transverse to a respective first and second helical spiral direction, and a greater stiffness in said respective first and second helical spiral direction than transverse thereto. Further, the curved cross-section may be flattened in the flexed position. In some aspects, the deployable column lattice structure may further include a restraint device to apply a restraint force to restrain the first and second portions of shell hinge elements in the flexed position.

Another embodiment herein provides a deployable column lattice structure including a plurality of ring frames, a first portion of shell hinge elements operatively connected to the plurality of ring frames, and a second portion of shell hinge elements operatively connected to the plurality of ring frames. The ring frames are disposed on respective parallel planes lying transverse to an axis having an axial direction, and each of the ring frames has a center intersecting the axis and includes an outer axial surface. The first portion of shell hinge elements operatively connected to the plurality of ring frames, extend helically in the axial direction to form a first helical pattern having a first helical axis. The second portion of shell hinge elements operatively connected to the plurality of ring frames, extend helically in the axial direction to form a second helical pattern having a second helical axis, and forms a mirrored symmetric double helix pattern with the first helical pattern. The second helical pattern is oriented in an opposite direction to the first helical pattern and is congruent to the first helical pattern. The first and second portions of shell hinge elements are configured to store energy in a stored energy state when the plurality of ring frames are collapsed toward one another in the axial direction. The first and second portions of shell hinge elements are configured to release the stored energy to deploy to a restored state and extend the plurality of ring frames apart from each other in the axial direction to form a stable rigid axial column.

In some aspects, the first helical pattern and the second helical pattern may extend between a first pair of the plurality of ring frames lying adjacent to one another in the axial direction, and a different first helical pattern and a different second helical pattern may extend between pairs of the plurality of ring frames lying adjacent to one another, other than the first pair, in the axial direction. In some aspects, the lattice structure may further include a constraint device configured to restrain translation of the plurality of ring frames in the axial direction when engaged. The plurality of ring frames may be configured to deploy in the axial direction when the constraint device is disengaged. The first and second portions of shell hinge elements may be configured to transition from the stored energy state to the restored state in a continuous circumferentially balanced, and axially stable, self-correcting deployment movement along the axis. In some aspects, the first portion of shell hinge elements and the second portion of shell hinge elements may form a sparse-isogrid lattice structure on the outer axial surfaces of the plurality of ring frames forming the stable rigid axial column.

In some aspects, the first helical pattern and the second helical pattern may form vertices of the mirrored symmetric double helix pattern, and each vertex may be disposed on a first group of the plurality of ring frames. At least one ring frame in a second group of the plurality of ring frames may be disposed between each adjacent ring frame of the first group. Each shell hinge element of the first portion of shell hinge elements and the second portion of shell hinge elements may operatively connect to a ring frame in the first group at a first end and an adjacent ring frame in the second group at a second end opposite the first end.

In some aspects, the mirrored symmetric double helix pattern may include at least one vertex that may include an end region of a shell hinge element in the first portion of shell hinge elements spaced apart from an end region of a shell hinge element in the second portion of shell hinge elements on the outer axial surface of at least one ring frame of the plurality of ring frames. In some aspects, the mirrored symmetric double helix pattern may include at least three mirrored symmetric double helix patterns. In some aspects, the lattice structure may further include at least one fastener that may include a displacement limiting element to connect at least one of the shell hinge elements to the outer axial surface of at least one of the plurality of ring frames, and the displacement limiting element may be configured to limit strain in the at least one of the shell hinge elements when stowed in the stored energy state.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a diagram of a shell hinge element, for example, a flexible tape spring, in a fully extended, lock out arrangement in a deployed configuration according to an embodiment herein;

FIG. 3B is a diagram of the shell hinge element of FIG. 3A in a flattened and partially folded arrangement between a deployed configuration and a stowed configuration according to an embodiment herein;

FIG. 3C is a diagram of the shell hinge element of FIG. 3A in a flattened and folded arrangement in a stowed configuration according to an embodiment herein;

FIG. 3D is a diagram of another view of the shell hinge element of FIG. 3C in the flattened and folded arrangement in the stowed configuration according to an embodiment herein;

FIG. 3E is a diagram of a cross-section view of the shell hinge element of FIG. 3A in the fully extended, lock out arrangement according to an embodiment herein;

FIG. 3F is a diagram of a cross-section view of the shell hinge element of FIG. 3B in the flattened and partially folded arrangement according to an embodiment herein;

FIG. 4A is a diagram of a side view of a clamp tab according to an embodiment herein;

FIG. 4B is a diagram of an underside of the clamp tab of FIG. 4A according to an embodiment herein;

FIG. 5C is a schematic diagram of the sparse-isogrid structure shown in FIG. 5A in the stowed configuration and without the shell hinge elements for convenience of illustration according to an embodiment herein;

FIG. 5D is a schematic side view diagram of the sparse-isogrid structure shown in FIG. 5A in the stowed configuration and without the shell hinge elements for convenience of illustration showing increasing rigid ring frame diameters according to an embodiment herein;

FIG. 5E is a schematic side view diagram of a sparse-isogrid structure in the deployed configuration showing a first double helix between rigid ring frames and a second double helix between adjacent rigid ring frames according to an embodiment herein;

FIG. 5F is a schematic side view diagram of a sparse-isogrid structure in the deployed configuration showing a first double helix between rigid ring frames and a second double helix between adjacent rigid ring frames offset in a circumferential direction from the first double helix according to an embodiment herein;

FIG. 6 is a schematic side view diagram of a sparse-isogrid structure such as shown in FIG. 5C in the stowed configuration and without the shell hinge elements for convenience of illustration and showing a restraint device according to an embodiment herein;

FIG. 7A is a schematic diagram of a sparse-isogrid structure having decreasing ring frame diameter in the axial direction "A" in a deployed configuration according to an embodiment herein;

FIG. 7B is a schematic diagram of another sparse-isogrid structure having increasing ring frame diameter in the axial direction "A" in a deployed configuration according to an embodiment herein;

FIG. 8A is a schematic diagram of another sparse-isogrid structure having constant ring frame spacing and decreasing ring frame diameter in the axial direction "A" in a deployed configuration according to an embodiment herein; and FIG. 8B is a schematic diagram of another sparse-isogrid structure having decreasing ring frame spacing and decreasing ring frame diameter in the axial direction "A" in a deployed configuration according to an embodiment herein.

DETAILED DESCRIPTION

Figure 1:
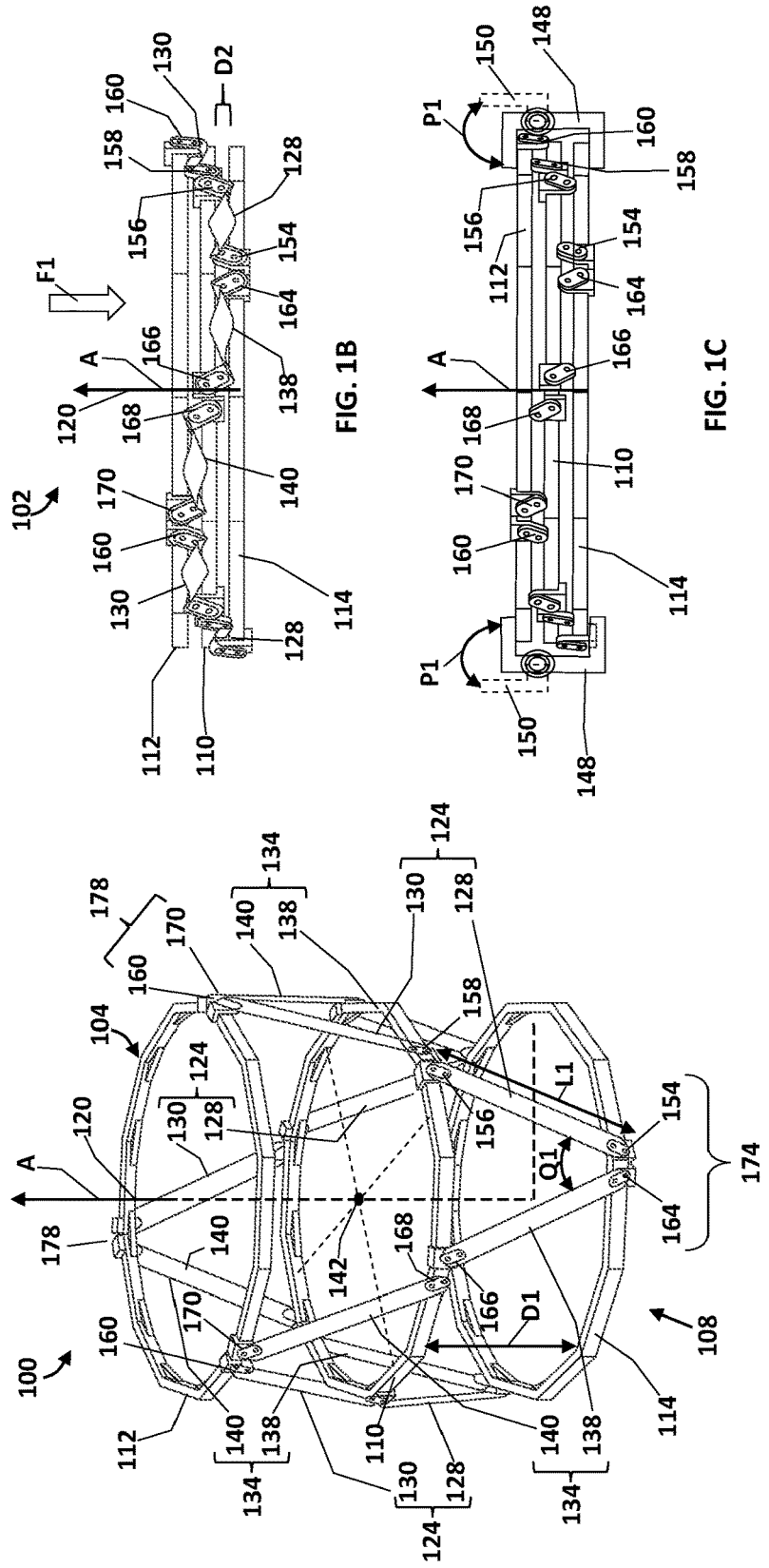
FIG. 1A is a schematic diagram of a sparse-isogrid structure in a deployed configuration according to an embodiment herein.
FIG. 1B is a schematic diagram illustrating the sparse-isogrid structure of FIG. 1A in a collapsed, referred to herein as a stowed, configuration according to an embodiment herein.
FIG. 1C is a schematic diagram illustrating the sparse-isogrid structure of FIG. 1A in a stowed configuration with shell hinge elements removed to show ring frames and fasteners having displacement limiting elements according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In the drawings, the size and relative sizes of layers and regions may be exaggerated for clarity. Referring now to the drawings, and more particularly to FIGS. 1A through 8B, where similar reference characters denote corresponding features consistently throughout the figures, there are shown exemplary embodiments. The embodiments herein generally relate to an extensible sparse-isogrid column structure, and more particularly to a sparse-isogrid column structure with high strain composite ribs, configured to freely deploy.

FIG. 1A through 1C show various views of an extensible sparse-isogrid column structure 100 in accordance with the embodiments herein. FIG. 1A is a schematic diagram of a sparse-isogrid structure in a deployed configuration, FIG. 1B is a schematic diagram illustrating the sparse-isogrid structure of FIG. 1A in a collapsed, referred to herein as a stowed, configuration, and FIG. 1C is a schematic diagram illustrating the sparse-isogrid structure of FIG. 1A in a stowed configuration with shell hinge elements removed to show ring frames and fasteners having displacement limiting elements according to an embodiment herein.

Referring to FIGS. 1A through 1C, in one embodiment, tubular structure 100 can be configured to articulate between a stowed configuration 102 and a deployed configuration 104, the tubular structure 100 can include a double helix 108 and a plurality of rigid rings 110, 112, 114. The double helix 108 can include a helix axis 120, a first helix 124 comprised of a first flexible tape spring 128, and a second helix 134 congruent to the first helix 124, oriented in an opposite direction to the first helix 124. The second helix 134 can also include a second flexible tape spring 138. The flexible tape springs 128, 138, are also referred to herein as shell hinge elements. In an embodiment, the rigid rings 110, 112, 114 are connected to the first helix 124 and the second helix 134. The first and second helixes 124, 134 can be connected to the rigid rings 110, 112, 114 by clamps, fasteners, bonding cement, welds, glue, or the like, and combinations thereof.

As illustrated, each rigid ring 110, 112, 114 is disposed on a respective parallel plane transverse to the helix axis 120, and each rigid ring 110, 112, 114 includes a respective ring center 142 intersected by the helix axis 120. The first helix 124 and the second helix 134 are configured to flex to translate the plurality of rigid rings 110, 112, 114 with respect to each other along the helix axis 120, for example, in the negative "A" direction. The rotation of the rigid rings 110, 112, 114 about the helix axis 120 relative to the first and second helixes 124, 134 is restricted by the connected first and second helixes 124, 134. In a stowed configuration 102, a restraining force F1 compresses the first and second helixes 124, 134, and in a deployed configuration 104 the restraining force F1 does not compress the first and second helixes 124, 134. The restraining force F1 can be a restraint or restraining device 148 as described later with respect to FIG. 1C.

In the deployed configuration 104, the first and second helixes 124, 134 are extended to respective maximum lengths in the deployed configuration 104 as shown in FIG. 1A. For example, the first flexible tape spring 128 is extended in the first helix 124 spiral direction to its full length L1 at an angle "Q1" to the second flexible tape spring 138, extended to its full length (L1) in the second helix 134 spiral direction. Angle "Q1" between first and second helixes 124, 134 is symmetrical about the helix axis 120 and can be in a range from near 0° to near 180°, for example, angle "Q1" can be 15°, 30°, 45°, 60°, 75°, 90°, 105°, 120°, 135°, 150°, 165°, or even 175°. In preferable embodiments, angle "Q1" can be near or about 60°, whereas in other embodiments, angle "Q1" can be near or about 30°, 45°, 75°, 90°, or 105°. The rigid rings 110, 112, 114 can be spaced apart from one another by a maximum distance D1 in the deployed configuration 104. The maximum distance D1 can be predetermined based on the length L1 of the first and second flexible tape springs 128, 138 and the angle "Q1".

In the stowed configuration 102, the rigid rings 110, 112, 114 can be separated by a minimum distance D2 in the stowed configuration 102, with the minimum distance D2 being less than the maximum distance D1. For example, the minimum distance D2 can be zero when the rigid rings 110, 112, 114 are contacting adjacent rigid rings 110, 112, 114 in the stowed configuration 102. Furthermore, adjacent rigid rings 110, 112, 114 can nest together, such as in a cup and cone arrangement in the stowed configuration 102. In other embodiments, the rigid rings 110, 112, 114 can be spaced apart in the stowed configuration 102 by a minimum distance D2 greater than zero.

In some embodiments, the restraining force F1 is substantially collinear with the helical axis 120. The restraining device 148 can impose the restraining force F1 on the first and second helixes 124, 134. The restraining device 148 can be a clip, clamp, strap, band, cord, and the like or combinations thereof. The first and second helixes 124, 134 can store a restorative force opposed to the restraining force F1. For example, the first and second flexible tape springs 128, 138 store strain energy when flattened and folded as illustrated in FIG. 1B. The first and second helixes 124, 134 can apply the restorative force to the rigid rings 110, 112, 114 upon removal of the restraining force F1, to articulate to the deployed configuration 104. For example, a bottom rigid ring 114 can be disposed on a base structure and the adjacent rigid ring 110 can move in the axial direction "A" when the restraint device 148 releases a top rigid ring 112, which also moves in the axial direction "A" under the restorative force. The restraint device 148 can have a latch element 150 to move in direction P1 to release the constraint force F1. When the constraint force F1 is released the tubular structure 100 freely deploys to the deployed configuration 104.

In some embodiments, the restraint device 148 can have a series of latch elements 150, to release the top rigid ring 112 and then independently release the adjacent rigid ring 110 to control the deployment. In some embodiments, a retarding force can be applied to the freely deploying structure 100 to slow a propulsion of the ring frames 110, 112, 114 in the axial direction "A" due to the restorative force.

The flexible tape springs 128, 138, also referred to herein as shell hinge elements, that extend in the respective first and second helix 124, 134 spiral directions in the deployed configuration 104 can each be connected to the ring frames 110, 112, 114, by a clamp, fastener, and the like at each end of the shell hinge element. As illustrated in FIGS. 1A and 1B, the first flexible tape spring 128 is connected to a first ring frame 114 at a first connector 154. The opposite end of the first flexible tape spring 128 is connected to a second, adjacent, ring frame 110 at a second connector 156. The first helix 124 continues as a right-hand spiral comprised of a third flexible tape spring 130 extending from a third connector 158 at the second ring frame 110 to a fourth connector 160 at the third ring frame 112. The first helix 124 can continue in this manner to additional ring frames.

The second flexible tape spring 138 is connected to the first ring frame 114 at a fifth connector 164. The opposite end of the second flexible tape spring 138 is connected to the second ring frame 110 at a sixth connector 166. The second helix 134 continues as a left-hand spiral comprised of a fourth flexible tape spring 140 extending from a seventh connector 168 at the second ring frame 110 to an eighth connector 170 at the third ring frame 112. The second helix 134 can continue in this manner to additional ring frames.

In the embodiment shown in FIGS. 1A through 1C, three double helixes 108 of first helixes 124 and second helixes 134 extend between the ring frames 110, 112, 114. The first helix 124 intersects the second helix 134 at vertices 174, 178 on the first ring frame 114 and the third ring frame 112.

Figure 2:
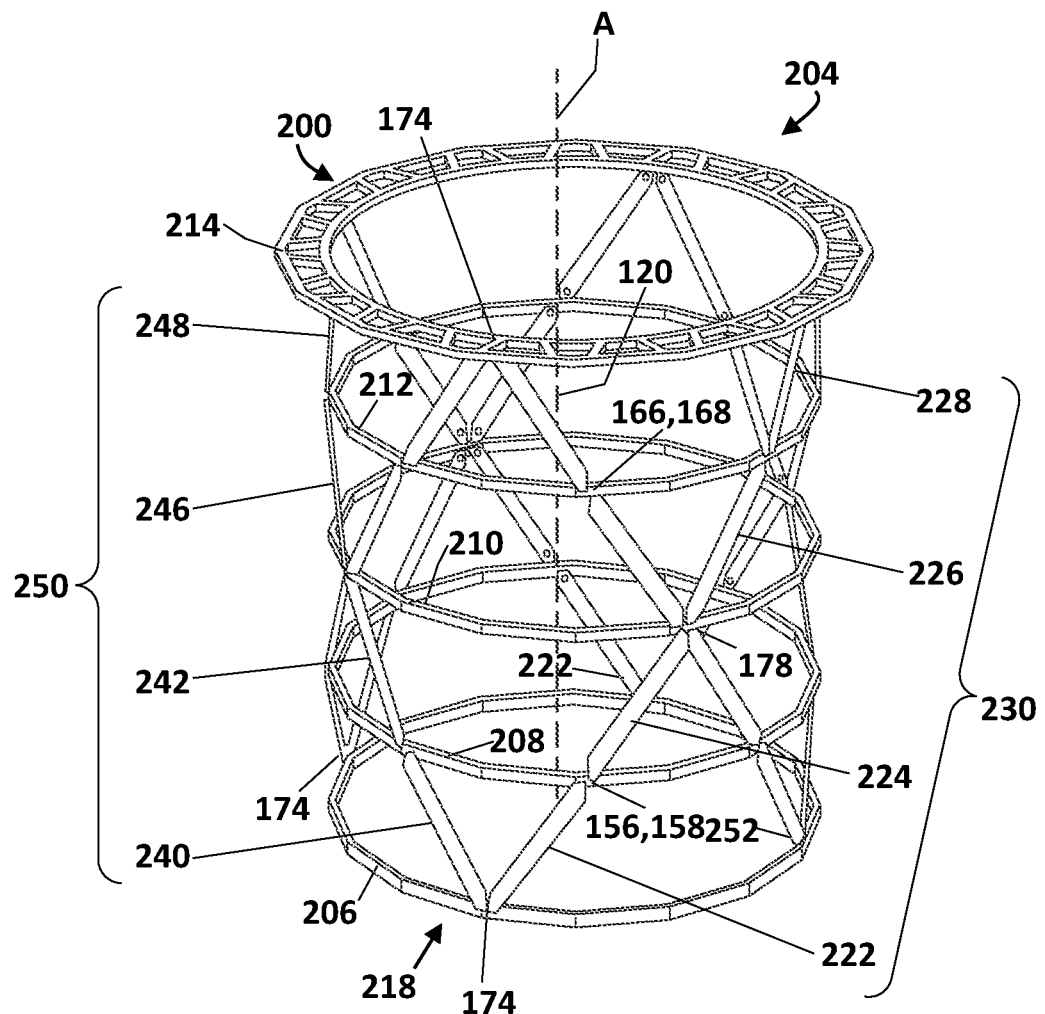
FIG. 2 is a schematic diagram of a sparse-isogrid structure having additional ring frames to that shown in FIG. 1A to illustrate a double helix pattern of shell hinge elements in a deployed, referred to herein as a tubular and/or column, configuration according to an embodiment herein.

FIG. 2, with reference to FIGS. 1A through 1C, is a schematic diagram of a sparse-isogrid lattice structure referred to herein as a tubular and/or column configuration having additional ring frames to that shown in FIG. 1A to illustrate a double helix pattern of shell hinge elements in a deployed configuration 104 according to an embodiment herein.

The illustrated extensible column lattice structure 200 can include a plurality of ring frames 206, 208, 210, 212, 214 disposed substantially transverse to an axial direction "A" and having respective centers disposed substantially collinearly, and a double helix pattern 218 disposed substantially coaxially to the ring frames 206, 208, 210, 212, 214 along the axial direction "A". The double helix pattern 218 can include a first portion of shell hinge elements 222, 224, 226, 228 connected to the ring frames 206, 208, 210, 212, 214 and extending substantially in a first helical pattern 230, and a second portion of shell hinge elements 240, 242, 246, 248 connected to the ring frames 206, 208, 210, 212, 214 and extending substantially in a second helical pattern 250 congruent to the first helical pattern 230 oriented in an opposite direction to the first helical pattern 230. The first and second portion of shell hinge elements 222, 224, 226, 228, 240, 242, 246, 248 are configured to articulate between a flexed position in a stowed configuration and an unflexed position in a deployed configuration 204.

FIGS. 3A through 3F, with reference to FIGS. 1A through 2, illustrate various embodiments of the shell hinge element 314. FIG. 3A is a diagram of a shell hinge element 314, for example, a flexible tape spring, in a fully extended, lock out arrangement in a deployed configuration 304 according to an embodiment herein. A first end of the shell hinge element 314 is connected to a first rigid ring frame 308 by a first connector 318 and a second end of the shell hinge element 314 is connected to a second rigid ring frame 310 adjacent to the first rigid ring frame 308, by a second connector 322.

FIG. 3B is a diagram of the shell hinge element 314 of FIG. 3A in a flattened 326 and partially folded 330 arrangement between a deployed configuration 304 and a stowed configuration 302 according to an embodiment herein. Folded 330 herein refers to an elastic deformation of the stiff and resilient tape spring shell hinge element 314 and can include buckled, twisted, compressed, and the like, or combinations thereof. FIG. 3C is a diagram of the shell hinge element 314 of FIG. 3A in a flattened and folded 330 arrangement in a stowed configuration 302 according to an embodiment herein. FIG. 3D is a diagram of another view of the shell hinge element 314 of FIG. 3C in the flattened and folded 330 arrangement in the stowed configuration 302 according to an embodiment herein.

The shell hinge element 314 can have a curved cross-section 334 transverse to a longitudinal direction of the shell hinge element 314 extending in the helix spiral direction. FIG. 3E is a diagram of a cross-section view of the shell hinge element 314 of FIG. 3A taken across E-E', in the fully extended, lock out arrangement according to an embodiment herein. The shell hinge element 314 can be manufactured to have the predetermined curved cross-section 334. The curved cross-section 334 provides additional axial strength in the longitudinal direction of the shell hinge element 334. The curved cross-section 334 is flattened 326 to fold 330 the shell hinge element 314 and bring ring frames 308 and 310 together to stow the lattice structure 100.

FIG. 3F is a diagram of a cross-section view of the shell hinge element 314 of FIG. 3B taken across F-F' in the flattened and partially folded arrangement according to an embodiment herein. A force F2 can be applied to flattened 326 and fold 330 the shell hinge element 314 and bring ring frames 308 and 310 together to stow the lattice structure 100. This force F2 can be referred to as a stowage force or a reset force. A reset device (not shown), such as a piston, platen, lever, strap, band, crank, manual, and the like, or a combination thereof can apply the reset force. When the shell hinge element 314 is flattened, the shell hinge element 314 stores elastic strain energy. The elastic strain energy exerts a restorative force 338 to return the shell hinge element 314 to its predetermined curved cross-section 334. The force F2 applied to flatten 326 the shell hinge element 314 and bring ring frames 308 and 310 together to stow the lattice structure 100 also folds 330 the shell hinge element 314. When the shell hinge element 314 is folded 330, the shell hinge element 314 stores elastic strain energy. The elastic strain energy exerts a restorative force 340 to return the shell hinge element 314 to its predetermined unfolded shape.

The shell hinge element 314 is illustrated as connected to the rigid ring frames 308, 310 by connectors 318, 322. Examples of connectors 318, 322 are clamps, fasteners, bonding cement, welds, glue, or the like, and combinations thereof. In some of these embodiments, at least one fastener can comprise a displacement limiting element to connect at least one shell hinge element 314 to the outer axial surface of at least one ring frame 308, 310. In some embodiments, the displacement limiting element can be configured to limit strain in the at least one shell hinge element 314 when stowed.

FIG. 4A, with reference to FIGS. 1A through 3F, is a diagram of a side view of a clamp tab 406 connector 318, 322 according to an embodiment herein, and FIG. 4B is a diagram of an underside of the clamp tab 406 of FIG. 4A. The clamp tab 406 is an example of a fastener having displacement limiting elements according to an embodiment herein. The clamp tab 406 can comprise a bolt head side 352 (underside) that holds the shell hinge element 314 securely to the rigid ring frame 308, 310. The bolt head side 352 can include a curved surface 354 next to the tape spring 314 fold 330. The bolt head side 352 can have the curved surface 354 on a first end 358 facing the tape spring 314 fold 330 and not on a second end 360 as illustrated, or the bolt head side 352 can have the curved surface 354 on the first end 358 facing the tape spring 314 fold 330 and on the second end 360. The curved surface 354 can be greater than a minimum radius of curvature allowed for the tape spring 314. The curved surface 354 can have a radius greater than a predetermined minimum radius for a particular laminate of the tape spring 314. Screws or bolts can pass through holes 362, 364 to secure the clamp tab 406 to the rigid ring frame 308, 310 to attach the tape spring 314 end to the rigid ring frame 308, 310.

The clamp bolt head side 352 (underside) clamps a central portion of the tape spring 314 and leaves the sides of the tape springs 314 free to move. This provides that the tape spring 314 can flatten when stowed 302 and regain most of its cross-sectional curvature when extended and deployed 304. Otherwise, for example, if clamped flat, the tape spring 314 may not be able to take much of an axial compression load when deployed 304. Furthermore, if clamped as a fixed curve, the tape spring 314 may not fold 330 to be stowed. That is, the tape spring 314 is flattened 326 and folded 330 in the stowed configuration 302. Even when half-way deployed as shown in FIG. 3B, the clamp tabs 406 prevent the tape spring 314 from material failure by imposing the minimum radius of curvature of the curved surface 354. The contact point of the tape spring 314 to the clamp tab 406 moves as the tape spring 314 deploys. The clamp tab 406 has the smooth continuous curved surface 354 to allow this movement while in contact. The curved surface 354 can be spherical, or a predetermined variable curvature for a predetermined tape spring 314 geometry and stiffness.

The tape spring 314 right before end of deployment configuration 104, 304, going from FIG. 1B to FIG. 1A or going from FIG. 3A to FIG. 3B, begins to regain its cross-sectional curvature 334. At this disposition the clamping tab 406 constraint surfaces 354, 358 can be no longer in contact with the tape spring 314. The tape spring 314 transitions to fully deployed configuration 104, 304 can be abrupt and quick, referred to herein as snap-through or bifurcation. Once the tape spring 314 is in the deployed shape, it can withstand more axial load, in the direction of the helix spiral, than when not in the deployed shape. In fact, the tape spring 314 can withstand an axial load up to the critical buckling load for this member 314. Critical buckling load of a structural member is strongly related to its length. The longer it is, the lower the buckling load. The lattice structure 100 unexpectedly exhibits an advantage by exploiting this relationship. The tape springs 314 individually may not be great structural components in terms of buckling strength, but if they are less than a predetermined length relative to their cross-sectional curvature, they can withstand a relatively high amount of compressive force. Surprisingly, they can withstand much higher compressive force than a small tube of equivalent mass. For example, each tape spring 314 individually may withstand not much more than 25 lb of force. Surprisingly, the tape springs 314, when put in the lattice structure 100, for example, a ring section, having two rigid ring frames 114, 110 and at least three double helixes 124, 134, can support about a 200 lb force.

In the stowed configuration 302, referring to FIGS. 2 and 3C, the first and second portion of shell hinge elements 222, 224, 226, 228, 240, 242, 246, 248, 314 can include the first stored elastic force 340 in the flexed position 302 to dispose ring frames 206, 208, 210, 212, 214, 308, 310 a first distance "H1" along the axial direction from each other, and the first and second portion of shell hinge elements 222, 224, 226, 228, 240, 242, 246, 248, 314 can include a second stored elastic force 342 less than the first stored elastic force 340, in the unflexed position to dispose the ring frames 206, 208, 210, 212, 214, 308, 310 a second distance "H2" along the axial direction from each other greater than the first distance "H1".

Figures 5A, 5B:
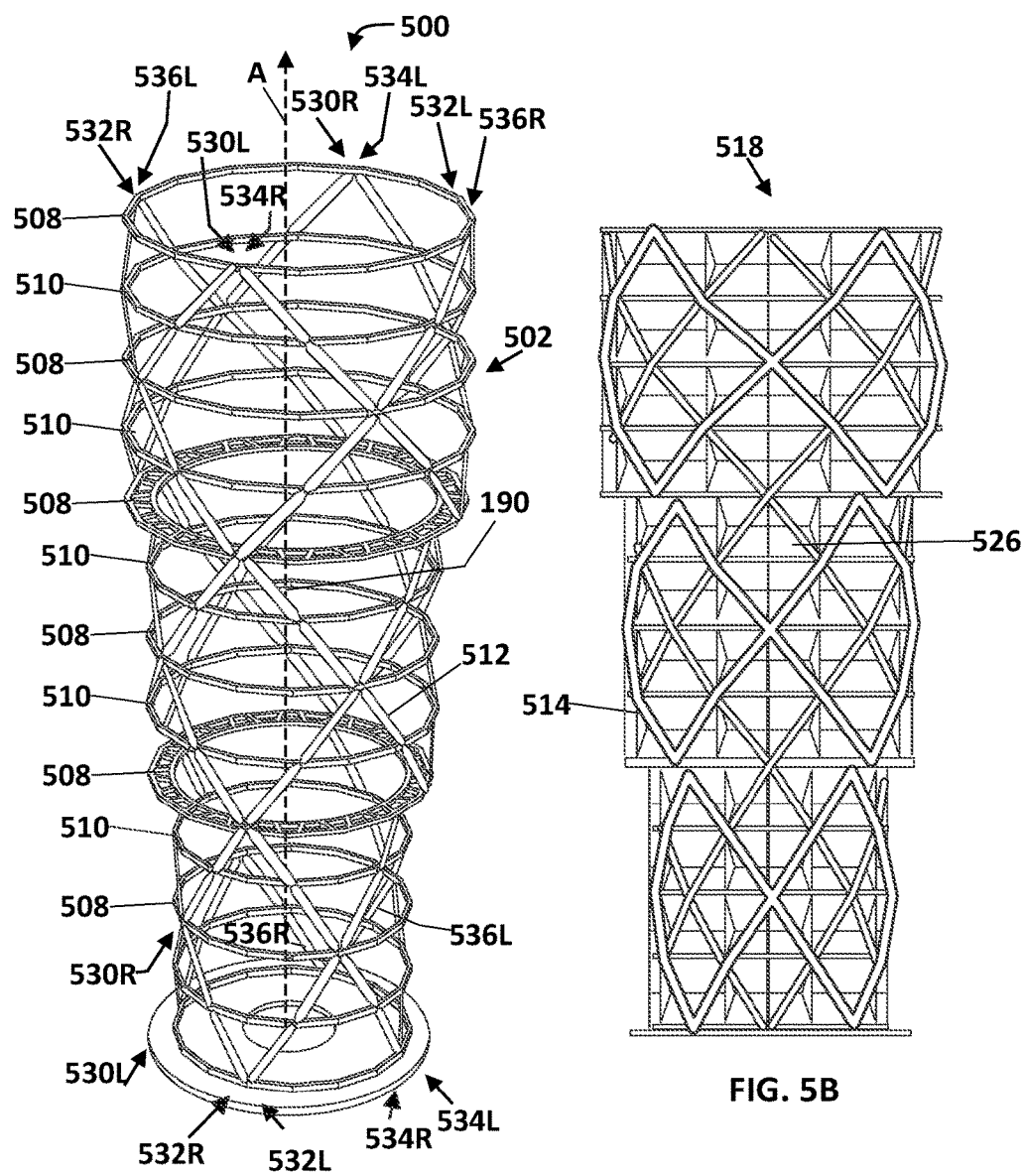
FIG. 5A is a schematic diagram of a sparse-isogrid structure having additional ring frames to that shown in FIG. 1A and having ring frames of increasing diameter in the axial direction "A" in a deployed configuration according to an embodiment herein.
FIG. 5B is a schematic diagram of a side view of the sparse-isogrid structure shown in FIG. 5A showing additional shell hinge elements to provide a non-sparse or full isogrid structure according to an embodiment herein.

FIGS. 5A through 5F, with reference to FIGS. 1A through 4B, illustrate various views of a spare-isogrid structures 500, 520, 540, 550. FIG. 5A is a schematic diagram of a sparse-isogrid structure 500 having additional ring frames 508, 510 to that shown in FIG. 1A and having ring frames 508, 510 of increasing diameter in the axial direction "A" in a deployed configuration 502 according to an embodiment herein. FIG. 5B is a schematic diagram of a side view of the sparse-isogrid structure 500 shown in FIG. 5A showing additional shell hinge elements 514 to provide a non-sparse or full isogrid structure 518 according to an embodiment herein. In the full isogrid structure 518, hinge shell elements 512, 514 and ring frames 508, 510 outer axial surfaces form a triangular pattern 526. In contrast to the full isogrid structure having a triangular grid pattern, the sparse-isogrid has a triangular and trapezoidal grid pattern. The first portion of shell hinge elements 222, 224, 226, 228 and the second portion of shell hinge elements 240, 242, 246, 248 can form a sparse-isogrid lattice structure on the outer axial surfaces of the ring frames 206, 208, 210, 212, 214 forming the stable rigid axial column 500.

FIG. 5C is a schematic diagram of the sparse-isogrid structure 500 shown in FIG. 5A in the stowed configuration 520 and without the shell hinge elements for convenience of illustration according to an embodiment herein. FIG. 5D is a schematic side view diagram of the sparse-isogrid structure 500 shown in FIG. 5A in the stowed configuration 520 and without the shell hinge elements for convenience of illustration showing rigid ring frames 508, 510 of increasing diameter 522, 524, 528 according to an embodiment herein.

FIG. 5A, with reference to FIGS. 1A through 4B, illustrates the deployed 502 column lattice structure 500 comprising ring frames 508, 510 arranged in an axial direction "A". Each ring frame 508, 510 has an outer axial surface with shell hinge elements 512 operatively connected thereto. A first portion of the shell hinge elements connected to the ring frames 508, 510 extends helically in the axial direction in a first helical pattern 530R, 532R, 534R, 536R. The first helical pattern 530R, 532R, 534R, 536R, can be considered a right-hand helix and four right hand helixes are disposed on the outer axial surfaces of the ring frames 508, 510 in FIG. 5A. A second portion of the shell hinge elements 512 connected to the ring frames 508, 510 extends helically in the axial direction in a second helical pattern 530L, 532L, 534L, 536L. The second helical pattern 530L, 532L, 534L, 536L, can be considered a left-hand helix and four left hand helixes are disposed on the outer axial surfaces of the ring frames 508, 510 in FIG. 5A. The second helical pattern 530L, 532L, 534L, 536L forms a mirrored symmetric double helix pattern with the first helical pattern 530R, 532R, 534R, 536R, where the second helical pattern 530L, 532L, 534L, 536L is oriented in an opposite direction to the first helical pattern 530R, 532R, 534R, 536R and congruent to the first helical pattern 530R, 532R, 534R, 536R.

The first and second portion of shell hinge elements 512 are configured to stow in a stored energy state when the ring frames 508, 510 are collapsed toward one another in the axial direction "A", for example, as shown in FIG. 5C. The first and second portion of shell hinge elements 512 are configured to release the stored energy to deploy to a restored state, for example, as shown in FIG. 5A and extend the ring frames 508, 510 apart from each other in the axial direction "A" to form the stable rigid axial column 500.

In some embodiments, the first helical pattern 530R, 532R, 534R, 536R, and the second helical pattern 530L, 532L, 534L, 536L can form vertices 174, 178 of the mirrored symmetric double helix pattern 218. Each vertex 174, 178 can be disposed on a first group 206, 210, 508 of the ring frames with at least one ring frame in a second group 208, 212, 510 of the ring frames disposed between each adjacent ring frames of the first group 206, 210, 508. In some embodiments, each shell hinge element of the first portion of shell hinge elements and the second portion of shell hinge elements can operatively connect to a ring frame in the first group 206, 210, 508 at a first end and an adjacent ring frame in the second group 208, 212, 510 at a second end opposite the first end. As used herein, "operatively connect" refers to elements being "on" or "connected to" another element or layer, directly on or directly connected to the other element or layer, or intervening elements or layers may be present.

In some of these embodiments, the mirrored symmetric double helix pattern 218 can include at least one vertex 174 comprising an end region of a shell hinge element in the first portion of shell hinge elements spaced apart from an end region of a shell hinge element in the second portion of shell hinge elements on the outer axial surface of at least one ring frame. For example, referring back to FIG. 1A, fifth connector 164 can be disposed on rigid ring frame 114 and spaced apart from first connector 154 and still form the vertex 174. In some of these embodiments, the mirrored symmetric double helix pattern comprises at least three mirrored symmetric double helix patterns.

FIG. 5E is a schematic side view diagram of a sparse-isogrid structure 540 in the deployed configuration showing a first double helix 542 between rigid ring frames 508, 510 and a second double helix 544 between adjacent rigid ring frames 506, 510 according to an embodiment herein. In this embodiment, the angle "Q2" between the left and right helixes of the first double helix 542 can be greater than the angle "Q3" between the left and right helixes of the second double helix 544. FIG. 5F is a schematic side view diagram of a sparse-isogrid structure 550 in the deployed configuration showing a first double helix 554 between rigid ring frames 508, 510 and a second double helix 556 between adjacent rigid ring frames 510, 506 offset 558 in a circumferential direction "C" from the first double helix 554 according to an embodiment herein. These embodiments shown in FIGS. 5E and 5F are examples of first and second double helical patterns and are not intended to be limiting, for example, a first double helix may have a different angle between left and right helixes, a circumferential offset between first and second double helixes, different length shell hinge elements, and the like or combinations thereof. While only one first and one second double helix is shown in these embodiments, three or more first double helixes can be disposed circumferentially around the structure between rigid ring frames and three or more second double helixes can be disposed circumferentially around the structure between subsequent rigid ring frames extending in the axial direction "A". In these embodiments, a first helical pattern and a second helical pattern extend between adjacent ring frames in the axial direction "A", and a different first helical pattern and a different second helical pattern extend between subsequent adjacent ring frames in the axial direction "A".

FIG. 6, with reference to FIGS. 1A through 5F, is a schematic side view diagram of a sparse-isogrid structure 600 such as shown in FIGS. 1A-2 and 5A-5F in the stowed configuration without the shell hinge elements for convenience of illustration and showing another embodiment of a restraint device 614. The restraint device 614 can release the sparse-isogrid structure 600 to freely deploy by moving in direction 618. The ring frames 608 may remain connected to a host 620, such as a wall, or spacecraft bus as they deploy away from each other by the extension of shell hinge elements. In some of these embodiments, the constraint device 614 can be configured to restrain the ring frames in the axial direction "A" when engaged. The ring frames 608 can be configured to deploy in the axial direction "A" when the constraint device 614 is disengaged. In some embodiments, deployment may be spontaneous when constraint device 614 is disengaged. The first and second portion of shell hinge elements can be configured to transition from the stowed, stored energy state to the deployed, restored state comprising a continuous circumferentially balanced, and axially stable, self-correcting axial deployment movement. In some embodiments, a retarding force can be applied to the freely deploying structure 600 to slow a propulsion of the ring frames 608 in the axial direction "A" due to the restorative force of the shell hinge elements from the first distance "H1" to the second distance "H2". The retarding force can operate by a retarding device similar to the reset force, but at a lower force level and in the opposite direction to the movement of a deploying end of the deploying structure 100, 200, 500, 600 can slow the rigid ring frames deployment. A retarding device (not shown), such as a piston, platen, lever, strap, band, crank, manual, pulley, and the like, or a combination thereof can apply the retarding force.

FIG. 7A, with reference to FIGS. 1A through 6, is a schematic diagram of a sparse-isogrid structure 700 having decreasing ring frame diameter in the axial direction "A" in a deployed configuration according to an embodiment herein. For example, a top ring frame 716 may have a smaller diameter than an intermediate ring frame 714 disposed toward a host 724 from the top ring frame 716, and the intermediate ring frame 714, may have a smaller diameter than a bottom ring frame 708. As used herein, diameter can refer to a predetermined cross-sectional dimension and does not have to refer to a circular shape of the ring frames. The double helix pattern of shell hinge elements 720 is shown connecting the ring frames 708, 714, 716 having increasing diameter to support payload 728. FIG. 7B, with reference to FIGS. 1A through 7A, is a schematic diagram of another sparse-isogrid structure 702 having increasing ring frame diameter in the axial direction "A" away from the host 724 in a deployed configuration according to an embodiment herein. The double helix pattern of shell hinge elements 720 is shown connecting the ring frames 716, 714, 708 having increasing diameter.

FIG. 8A, with reference to FIGS. 1A through 7B, is a schematic diagram of another sparse-isogrid 800 structure having constant ring frame 808, 814 spacing and decreasing ring frame diameter in the axial direction "A" in a deployed configuration according to an embodiment herein. For example, a ring frame 814 disposed further from the host 824 may have a smaller diameter than a ring frame 808 disposed closer to the host 824. The double helix pattern of shell hinge elements 820 is shown connecting the ring frames 808, 814 having decreasing diameter to support payload 828. FIG. 8B is a schematic diagram of another sparse-isogrid structure 802 having decreasing ring frame 808, 814 spacing and decreasing ring frame diameter in the axial direction "A" in a deployed configuration according to an embodiment herein. The shell hinge elements 830 connect the ring frames 808, 814. On a tapered cone with constant ring spacing as illustrated in FIG. 8A, the lattice angles must change between each ring section, so the tape springs remain mirror-symmetric and balanced. With a decreasing ring spacing along the column length, as shown in FIG. 8B, the lattice helical angle can be kept constant or near constant.

In some of these embodiments the shell hinge element can be a tape spring. The shell hinge element can be a stiff, resilient material to elastically store strain energy when deformed by a restraint, and return to a predetermined manufactured shape when the restraint is removed. For example, the shell hinge element can be a spring steel, a beryllium copper spring material, a laminar spring composite, and the like, or combinations thereof. For example, the shell hinge element can be a thin carbon fiber reinforced polymer (CFRP) laminate comprising three layers. The center layer can be an Intermediate Modulus (IM) carbon fiber epoxy oriented along the length of the hinge. The outer layers can be Astroquartz® (available from JPS Composite Materials) glass fiber epoxy plain weave oriented at ±45 along the length of the hinge. For stowage, the spring tapes can collapse and fold outwardly while the ring frames can stack neatly.

When deployed, or in its extended state, the tape spring can provide structural stiffness to the overall structure. When stowed, the tape spring can be buckled and folded to its stowed position, contorting in several directions. While in this stowed state, the tape spring stores a significant amount of strain energy (like a spring).

The high-strain composite tape springs can provide both the deployment force from the stored spring energy when folded and structural buckling strength when deployed. The tape springs are part of the sparse-isogrid and only need to be strong enough to prevent local buckling. This application of the high-strain composite tape springs provided unexpected and superior structural strength and stability in a sparse-isogrid that was previously considered impossible to make useful as a deployable structure. The sparse-isogrid structure described herein with reference to exemplary embodiments can be used for a deployable and stowable baffle, boom, truss, mast, stacer, tube, column, and the like, or combinations thereof.

While the sparse-isogrid may be less structurally efficient than a full isogrid structure, the sparse-isogrid was surprisingly found to perform well for the deployable structure described in the embodiments herein, while increasing manufacturing efficiencies and saving added costs related to complications of fully populating the structure with twice as many tape springs. For example, the shorter lengths of tape springs with an additional ring frame located mid-way lend to higher critical buckling loads for each tape spring, also, when the structure is stowed, the tape springs fold outwardly about the circumference of the rings providing a trade-off of less required stowed area for higher stowed stack height with additional rings.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A tubular structure configured to articulate between a stowed and a deployed configuration, the tubular structure comprising:
    a double helix comprising:
        a helix axis;
        a first helix; and
        a second helix congruent to said first helix, and oriented in an opposite direction to said first helix; and
    a plurality of rigid rings connected to said first helix and said second helix, each rigid ring disposed on a respective parallel plane transverse to the helix axis, and each rigid ring comprising a respective ring center intersected by said helix axis,
    wherein said first helix and said second helix are configured to flex to translate said plurality of rigid rings with respect to each other along said helix axis,
    wherein the parallel planes remain transverse to said helix axis during translation of said rigid rings,
    wherein rotation of said rigid rings about said helix axis relative to the first and second helixes is restricted by the connected first and second helixes, wherein in a stowed configuration, a restraining force compresses said first and second helixes, and
    wherein the tubular structure is disposed in a deployed configuration in the absence of said restraining force.

2. The tubular structure of claim 1, wherein said first and second helixes are extended to respective maximum lengths in said deployed configuration.

3. The tubular structure of claim 1, wherein said plurality of rigid rings are spaced apart by a maximum distance in said deployed configuration, and
    wherein said plurality of rigid rings are separated by a minimum distance in said stowed configuration, with said minimum distance being less than said maximum distance.

4. The tubular structure of claim 1, wherein said restraining force is substantially collinear with said helical axis, wherein said first and second helixes are respectively comprised of flexible tape springs for storing a restorative force opposed to said restraining force, wherein said tape springs are configured to articulate between a curved transverse cross-section when the tubular structure is disposed in said deployed configuration, and wherein said restorative force articulates the tubular structure to said deployed configuration upon removal of said restraining force.

5. The tubular structure of claim 4, further comprising a restraint for applying said restraining force to said first and second helixes to oppose said restorative force.

6. A deployable column lattice structure comprising:
    a plurality of ring frames disposed substantially transverse to an axial direction, and comprising respective ring centers disposed substantially collinearly;
    a double helix pattern disposed substantially coaxially to said plurality of ring frames along said axial direction, said double helix pattern comprised of a first portion of shell hinge elements connected to said plurality of ring frames and extending substantially in a first helical pattern, and a second portion of shell hinge elements connected to said plurality of ring frames and extending substantially in a second helical pattern congruent to said first helical pattern and oriented in an opposite direction to said first helical pattern,
    wherein said first and second portions of shell hinge elements are configured to articulate between respective flexed positions when the lattice structure is in a stowed configuration and respective unflexed positions when the lattice structure is in a deployed configuration, and
    wherein said first and second portions of shell hinge elements are comprised of a plurality of tape springs;
    wherein each of said tape springs is connected to two of said ring frames by two clamp tabs, respectively, and
    wherein each of said clamp tabs mechanically connects only one of said tape springs to only one of said ring frames.

7. The deployable column lattice structure of claim 6, wherein said first and second portions of shell hinge elements comprise a first stored elastic force in said flexed position to dispose said plurality of ring frames a first distance along said axial direction from each other, and said first and second portions of shell hinge elements comprise a second stored elastic force less than said first stored elastic force in said unflexed position to dispose said plurality of ring frames a second distance along said axial direction from each other greater than said first distance.

8. The deployable column lattice structure of claim 7, wherein at least one of said first and second portions of shell hinge elements curl transverse to a respective first and second helical spiral direction upon removal of said restraining force, to propel said plurality of ring frames to said unflexed position along said axis.

9. The deployable column lattice structure of claim 6, further comprising a reset device configured to apply a reset force to articulate said first and second portions of shell hinge elements from said unflexed position to said flexed position,
    wherein in said unflexed position, at least one of said tape springs comprises a curved cross-section transverse to a respective first and second helical spiral direction, and a greater stiffness in said respective first and second helical spiral direction than transverse thereto,
    wherein said curved cross-section is flattened in said flexed position.

10. The deployable column lattice structure of claim 6, wherein said ring frames remain disposed substantially transverse to said axial direction and the ring centers remain disposed substantially collinear when said first and second portions of shell hinge elements articulate between said flexed positions and said unflexed positions, respectively.

11. A deployable column lattice structure comprising:
    a plurality of ring frames disposed on respective parallel planes lying transverse to an axis having an axial direction, each of said ring frames having a center intersecting said axis and including an outer axial surface;
    a first portion of shell hinge elements operatively connected to said plurality of ring frames and extending helically in said axial direction to form a first helical pattern having a first helical axis; and
    a second portion of shell hinge elements operatively connected to said plurality of ring frames and extending helically in said axial direction to form a second helical pattern having a second helical axis, and forming a mirrored symmetric double helix pattern with said first helical pattern, wherein said second helical pattern is oriented in an opposite direction to said first helical pattern and congruent to said first helical pattern,
    wherein said first and second portions of shell hinge elements are configured to store energy in a stored energy state when said plurality of ring frames are collapsed toward one another in said axial direction, wherein said first and second portions of shell hinge elements are configured to release the stored energy to deploy to a restored state and extend said plurality of ring frames apart from each other in said axial direction to form a stable rigid axial column, and wherein said ring frame centers continuously intersect said axis as said plurality of ring frames are collapsed toward one another in said axial direction and as said plurality of ring frames are extended apart from each other in said axial direction.

12. The structure of claim 11, wherein said first helical pattern and said second helical pattern extend between a first pair of said plurality of ring frames lying adjacent to one another in said axial direction, and wherein a different first helical pattern and a different second helical pattern extend between pairs of said plurality of ring frames lying adjacent to one another, other than said first pair, in said axial direction.

13. The structure of claim 11, further comprising:

a constraint device configured to restrain translation of said plurality of ring frames in said axial direction when engaged, wherein said plurality of ring frames are configured to deploy in said axial direction when said constraint device is disengaged, and wherein said first and second portions of shell hinge elements are configured to transition from the stored energy state to the restored state comprising a continuous circumferentially balanced, and axially stable, self-correcting deployment movement along said axis.

14. The structure of claim 11, wherein said first portion of shell hinge elements and said second portion of shell hinge elements are comprised of a plurality of flexible tape springs;

wherein each of said tape springs is mechanically connected to two of said ring frames by two clamp tabs, respectively, and wherein each of said clamp tabs connects only one of said tape springs to only one of said ring frames.

15. The structure of claim 11, wherein said first helical pattern and said second helical pattern form vertices of said mirrored symmetric double helix pattern, wherein each vertex is disposed on a first group of said plurality of ring frames, wherein at least one ring frame in a second group of said plurality of ring frames is disposed between each adjacent ring frame of said first group, and wherein each shell hinge element of said first portion of shell hinge elements and said second portion of shell hinge elements operatively connect to a ring frame in said first group at a first end and an adjacent ring frame in said second group at a second end opposite said first end.

16. The structure of claim 11, wherein said mirrored symmetric double helix pattern comprises at least one vertex, said at least one vertex comprising an end region of a shell hinge element in said first portion of shell hinge elements spaced apart from an end region of a shell hinge element in said second portion of shell hinge elements on said outer axial surface of at least one ring frame of said plurality of ring frames.

17. The structure of claim 14 wherein said tape springs have a linear cross-section when said ring frames are collapsed toward one another in said axial direction.

18. The structure of claim 14, wherein said clamp tab is configured to permit said tape spring to assume said curved transverse cross-section when said ring frames are collapsed toward one another in said axial direction.

19. The tubular structure of claim 4, wherein said tape springs can flex independently of each other.

20. The tubular structure of claim 4, wherein each of said tape springs is mechanically connected to two of said rigid rings by two clamp tabs, respectively, and wherein each of said clamp tabs connects only one of said tape springs to only one of said rigid rings.

21. The tubular structure of claim 20, wherein said clamp tab is configured to allow said tape spring to assume said curved transverse cross-section when the tubular structure is disposed in said deployed configuration.

* * * * *